(12) United States Patent
Iida

(10) Patent No.: US 8,198,987 B2
(45) Date of Patent: Jun. 12, 2012

(54) RADIO TAG READING DEVICE AND RADIO TAG RECOGNITION METHOD USING THE DEVICE

(75) Inventor: Yuji Iida, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 384 days.

(21) Appl. No.: 12/624,571

(22) Filed: Nov. 24, 2009

(65) Prior Publication Data

US 2010/0141405 A1    Jun. 10, 2010

(30) Foreign Application Priority Data

Dec. 5, 2008    (JP) .................................. 2008-311448

(51) Int. Cl.
*H04Q 5/22*    (2006.01)

(52) U.S. Cl. ............... 340/10.52; 340/572.1; 340/572.2; 340/572.3; 340/572.4; 340/572.5; 340/5.1; 340/5.2; 340/5.3; 340/5.4; 340/5.5; 340/10.1; 340/10.2; 340/10.3; 340/10.4; 340/10.5; 700/111; 700/112; 700/115; 700/214; 700/215; 705/28

(58) Field of Classification Search .... 340/572.1–572.9, 340/5.1–5.6, 10.1–10.6; 700/111, 112, 115, 700/214, 215, 219–225; 705/28; 235/375–385
See application file for complete search history.

(56) References Cited

U.S. PATENT DOCUMENTS

2005/0102203 A1*   5/2005   Keong ............................. 705/28

FOREIGN PATENT DOCUMENTS

JP         2008-065386        3/2008

* cited by examiner

*Primary Examiner* — George Bugg
*Assistant Examiner* — Ojiako Nwugo
(74) *Attorney, Agent, or Firm* — Turocy & Watson, LLP

(57) ABSTRACT

A radio tag reading device has a target tag storage unit, a non-target storage unit, and an antenna. The target tag storage unit stores the tag data of any radio tag held in a section from which to read data. The non-target storage unit stores at least the identification data of any radio tag existing outside sections and sections that surround the section. The target tag storage unit stores all tag data read from radio tags via the antenna, except the tag data containing the identification data stored in the non-target tag storage unit.

16 Claims, 12 Drawing Sheets

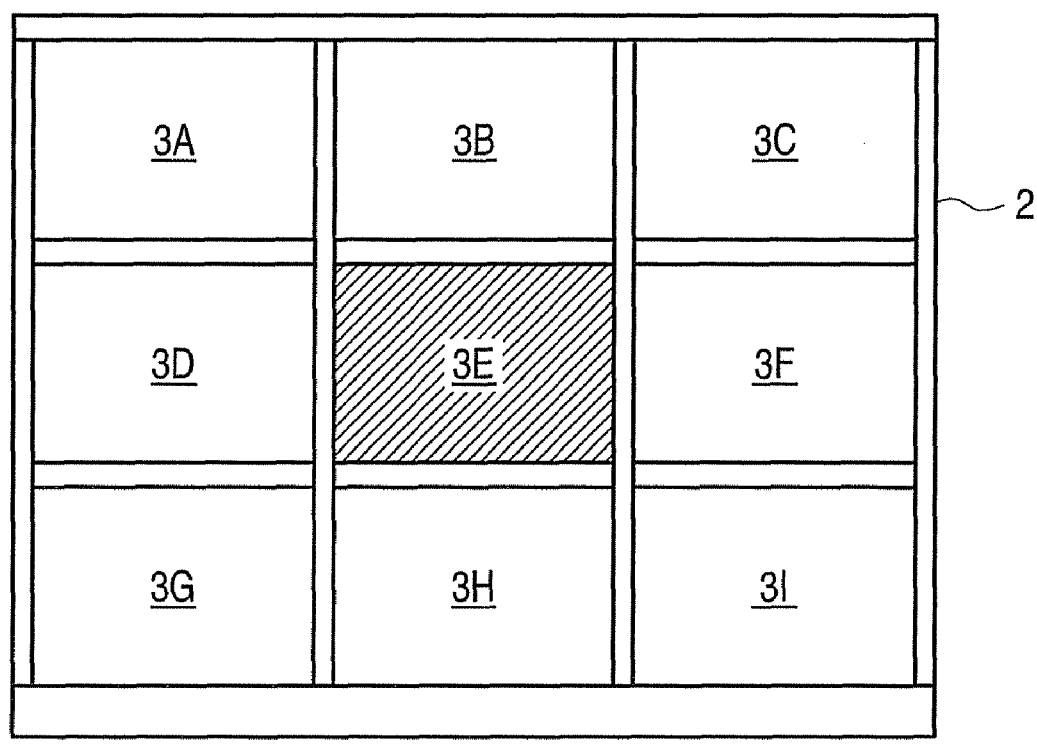
F I G. 14

RADIO TAG READING DEVICE AND RADIO TAG RECOGNITION METHOD USING THE DEVICE

CROSS-REFERENCE TO RELATED APPLICATION

This application is based upon and claims the benefit of priority from prior Japanese Patent Application No. 2008-311448, filed Dec. 5, 2008, the entire contents of which are incorporated herein by reference.

TECHNICAL FIELD

The present invention relates to a radio tag reading device that reads data from radio tags attached to items of merchandise without contacting the radio tags, and to a radio tag recognition method that uses this device.

BACKGROUND

In recent years, radio tags have attracted attention as technique of identifying items of merchandise. Any radio tag has a memory that stores a tag ID, i.e., tag identifier specific to the radio tag. A radio tag may be attached to an item of merchandise, and a radio tag reading device may read the tag ID, thereby identifying the item of merchandise. The radio tags of this type are also known as radio-frequency identification (RFID) tags.

The radio tag reading device has an antenna. The device performs radio communication with radio tags that exist in a communication area where the radio signals transmitted from the antenna can travel. The radio tag reading device can therefore read the tag data from any radio tag located in the area, without contacting the radio tag. Radio-tag reading devices are classified into two types, i.e., stationary type and handy type. The stationary type has an antenna that is fixed in place. The handy type comprises a main unit and an antenna secured to the main unit and can be portable.

The radio tag reading device of handy type may be used, for example, in making an inventory. In this case, the items of merchandise are stored in shelves, each with a radio-tag attached to it. The person in charge of inventory holds the radio tag reading device and moves it toward each shelf holding items of merchandise subjected to inventory. Then, the radio tag reading device reads data from the radio tags attached to these items of merchandise held on the shelf. The data read from the radio tags is output from the radio tag reading device to a host apparatus such as a personal computer. From data read from the radio tags, the host apparatus identifies the items of merchandise to which the radio tags are attached.

If a radio tag reading device of handy type is used in making an inventory, however, the following problems will arise. The reading area of the radio tag reading device is within the communication area of an antenna. Therefore, if the radio signals transmitted from the antenna have a low output level, the area in which the radio signals can travel is small, and data may not be read from some of the radio tags existing in the area. Conversely, if the radio signals transmitted from the antenna have a high output level, the area in which the radio signals can travel is large, and data may unnecessarily be read from radio tags no data may be read from some tags existing outside the area.

Japanese Patent Application No. 2008-065386 discloses a radio tag reading device of portable type that has the function of determining a failure of recognizing radio tags. This device counts the tag data items read from radio tags via its antenna. The device further photographs the section in which to read data from radio tags extracts the images of all radio tags that exist in the section, and counts the images of radio tags. The device then compares the number of tag data items with the number of radio-tag images. If the numbers compared are equal to each other, the device determines that all radio tags existing in the section have been recognized.

The radio tag reading device disclosed in the above-identified publication needs to have a function of photographing the section in which to read data from radio tags and a function of processing video data in order to extract the images of all radio tags that exist in the section. Inevitably, the device is complex and can hardly be manufactured at low cost.

SUMMARY

An object of the present invention is to provide a radio tag reading device that can accurately recognize the radio tags excising in a specific section and a method, and a radio tag recognition method that uses this device.

A radio tag reading device according to an aspect of this invention comprises: a target tag storage unit configured to store the tag data items of the radio tags existing in a specific section holding the radio tags from which to read data; a non-target tag storage unit configured to store at least the identification data specific to any radio tag that exists in sections surrounding the specific section holding the radio tags from which to read data; a control unit; and an output unit.

The control unit performs a non-target tag process of storing, in the non-target tag storage unit, at least the identification data included in the tag data read from the radio tag via the antenna, and a target tag process of storing, in the target tag storage unit, all tag data read from the radio tags via the antenna, except the tag data stored in the non-target tag storage unit containing the identification data stored in the non-target tag storage unit.

The output unit outputs the tag data stored in the target tag storage unit.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 14 is a schematic diagram showing a merchandise shelf for holding items of merchandise.

DETAILED DESCRIPTION

Av embodiment of this invention, which is a radio tag reading device of portable type for use in making an inventory in retail shops, will be described with reference to the accompanying drawings.

Figure 1:
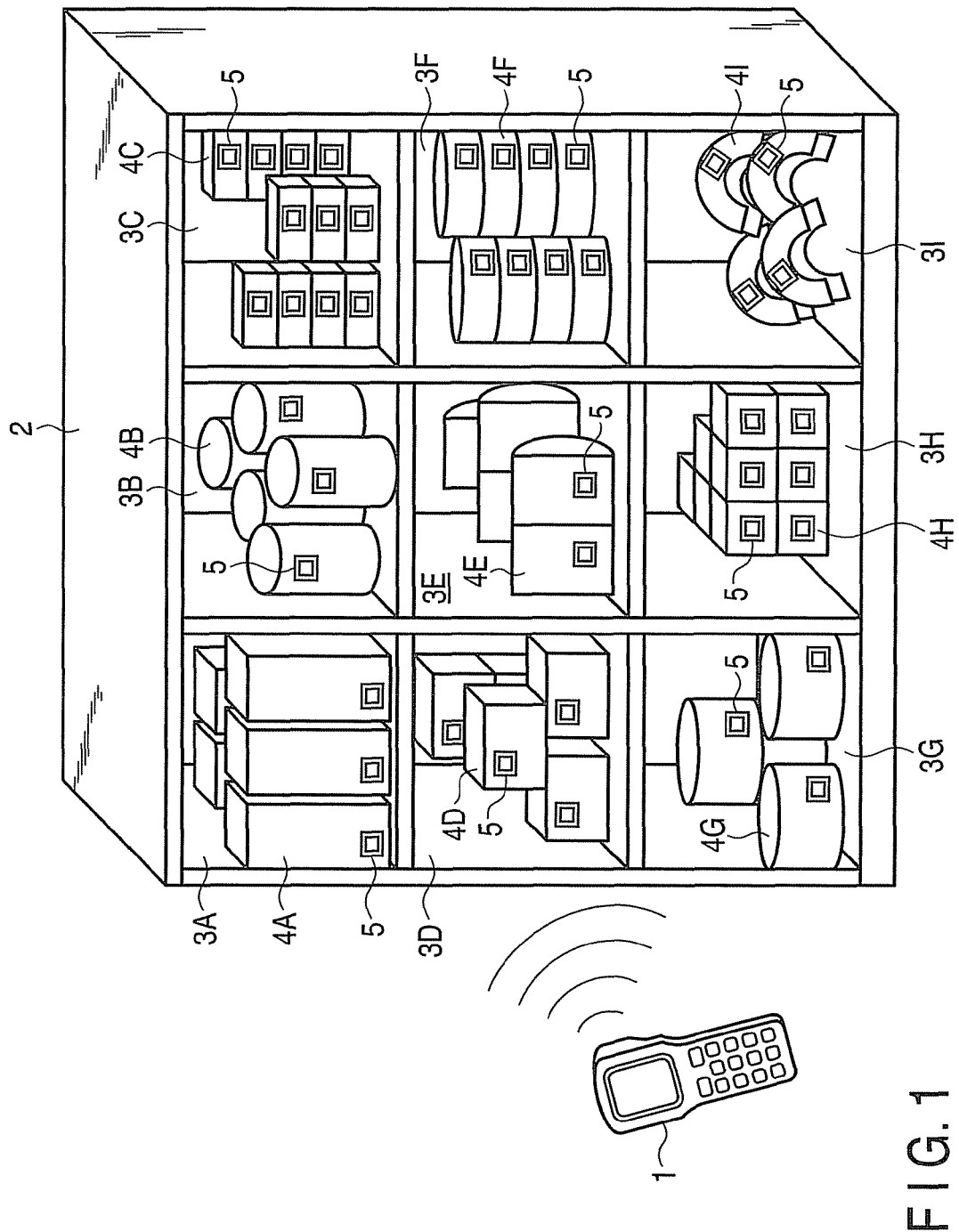
FIG. 1 is a schematic diagram for explaining an embodiment of the present invention.

First, the embodiment will be outlined, with reference to FIG. 1. FIG. 1 shows a portable-type radio tag reading device 1 and a merchandise shelf 2. The merchandise shelf 2 is divided into a plurality of sections. (In the case of FIG. 1, the shelf 2 is divided into nine sections 3A to 3I, i.e., 3 rows×3 columns.) Items of merchandise 4A are held in the section 3A, items of merchandise 4B held in the section 3B, items of merchandise 4C are held in the section 3C, and so forth. And items of merchandise 4I are held in the section 3I.

Figure 2:
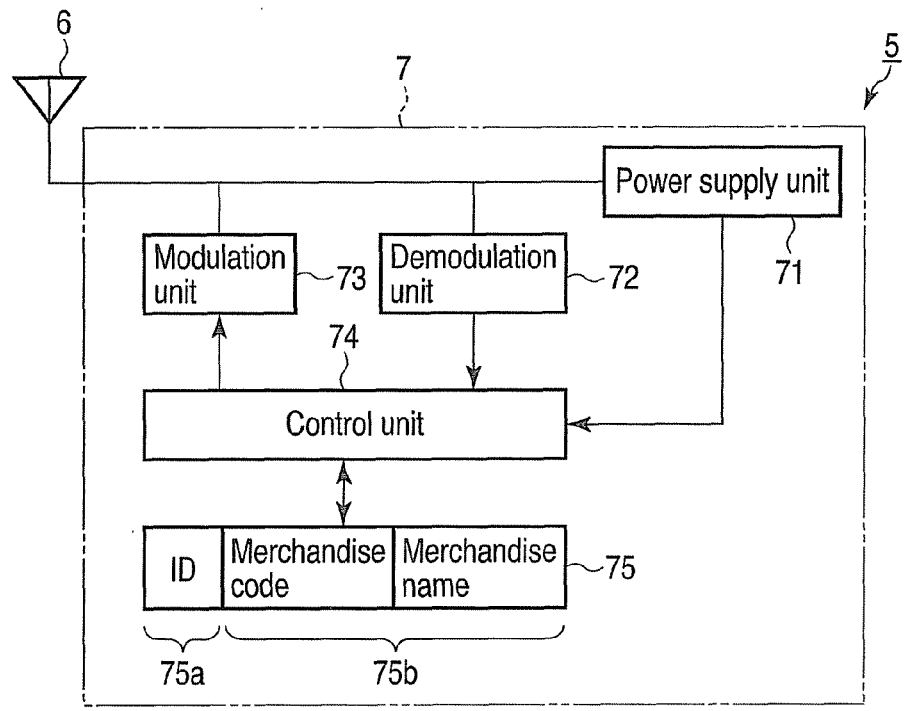
FIG. 2 is a block diagram showing the major components of a radio tag.

The block diagram of FIG. 2 shows the major components of each radio tag 5 used. The radio tag 5 comprises an antenna 6 and an IC chip 7. The antenna 6 and the IC chip 7 are small, both secured to tag member.

The chip 7 includes a power supply unit 71, a demodulation unit 72, a modulation unit 73, a control unit 74, and a storage unit 75. The power supply unit 71 rectifies and stabilizes a modulated signal received at the antenna 6, thereby generating power. The power generated is supplied to the other components of the chip 7. The demodulation unit 72 demodulates the modulated signal the antenna 6 has received. The signal thus demodulated is supplied to the control unit 74. Using the data output from the control unit 74, the modulation unit 73 performs a specific modulation, generating a modulated signal. The modulated signal is supplied to the antenna 6. The control unit 74 performs a process of writing the modulated data generated by the demodulation unit 72, to the storage unit 75, and a process of reading the data from the storage unit 75 and supplying the same to the modulation unit 73.

The storage unit 75 has an ID area 75a and a user area 75b. The ID area 75a holds ID data items specific to the radio tags 5, respectively. The user area 75b can hold any other data. The user area 76b holds merchandise data about each item of merchandise to which a radio tag 5 is attached. The merchandise data includes at least a merchandise code and a merchandise name. The merchandise code identifies the item of merchandise.

Figure 3:
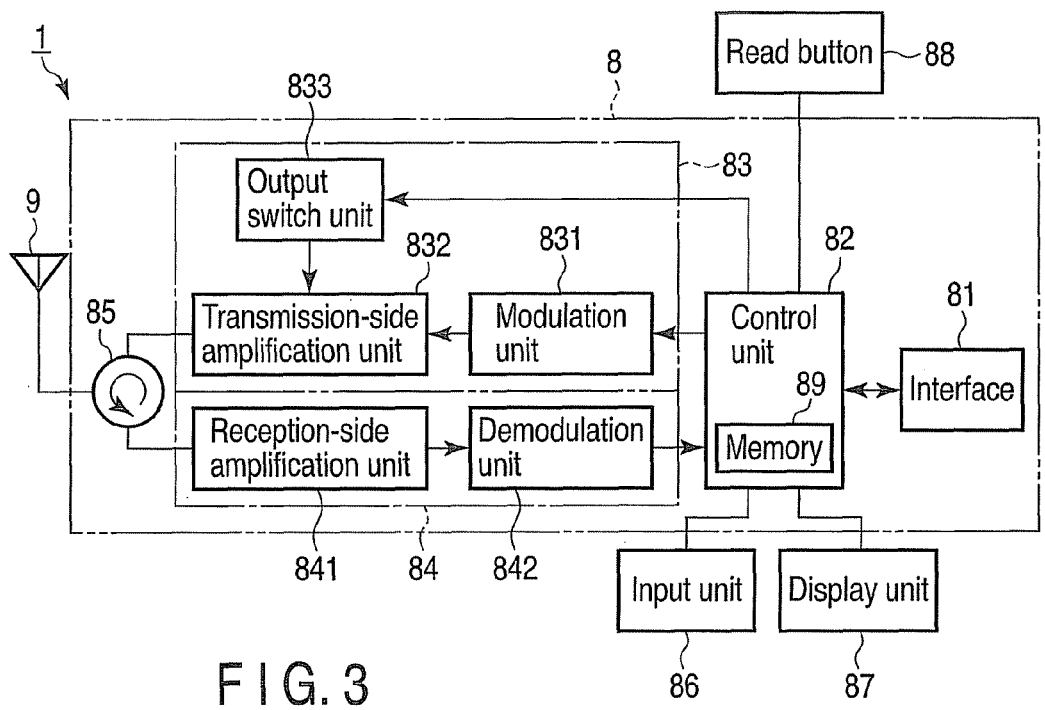
FIG. 3 is a block diagram showing the major components of a radio tag reading device.

The block diagram of FIG. 3 shows the major components of the radio tag reading device 1. The radio tag reading device 1 comprises a main unit 8 and an antenna 9. The main unit 8 is portable, and the antenna 9 is secured to the main unit 8. The main unit 8 comprises an interface unit 81, a control unit 82, a transmission unit 83, a reception unit 84, a circulator 85, an input unit 86, a display unit 87, and a read button 88.

The interface unit 81 achieves communication between the control unit 82 and a point-of-sales (POS) server. The POS server has the function of calculating the logical number of items of merchandise of each description, held in the shelf 2, from the data representing the number of items arrived, the number of items sold and the number of items discarded. The POS server has the function of calculating, from inventory data, the actual number of items of merchandise of each description, which actually remain in the shelf 2. Further, the POS server has the function of generating inventory data from the actual number of items of merchandise and the logical number of items of merchandise. The inventory data thus generated is input from the radio tag reading device 1 to the POS server.

The transmission unit 83 comprises a modulation unit 831, a transmission-side amplification unit 832, and an output switch unit 833. The modulation unit 831 modulates a specific carrier with the transmission data signal supplied from the control unit 82. The amplification unit 832 amplifies the signal output from the modulation unit 831. The output switch unit 833 changes the signal amplification factor of the amplification unit 832, step by step. The signal amplified by the amplification unit 832 is supplied via the circulator 85 to the antenna 9. The antenna 9 transmits the signal in the form of a radio signal. If the transmission-amplification unit 832 is set larger, the intensity of the radio signal transmitted from the antenna 9 will increase. Conversely, if the transmission-amplification unit 832 is set smaller, the intensity of the radio signal transmitted from the antenna 9 will decrease.

The circulator 85 receives a signal from the transmission unit 83 and outputs the same to the antenna 9, and receives a signal from the antenna 9 and outputs the same to the reception unit 84.

The reception unit 84 comprises a reception-side amplification unit 841 and a demodulation unit 842. The reception-side amplification unit 841 amplifies the signal input from the circulator 85. The demodulation unit 842 demodulates the signal the reception-side amplification unit 841 has amplified. The reception data signal, thus modulated by the demodulation unit 842, is supplied to the control unit 82.

Figure 4:
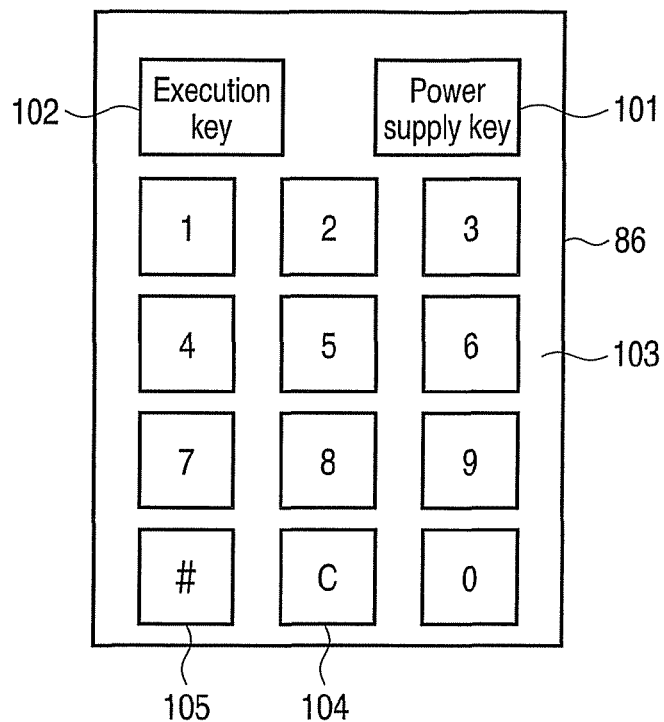
FIG. 4 is a schematic diagram showing the input unit of the radio tag reading device.

As shown in FIG. 4, the input unit 86 has various keys, such as a power supply key 101, an execution key 102, a numeric keypad 103, a clear (C) key 104, and a function (#) key 105. The display unit 87 displays the input from the input unit 86. While pressed, the read button 88 keeps supplying an on-signal to the control unit 82.

The input unit 86 and the display unit 87 are arranged on the front of the main unit 8. The read button 88 is arranged on one side of the main unit 8.

Figure 5:
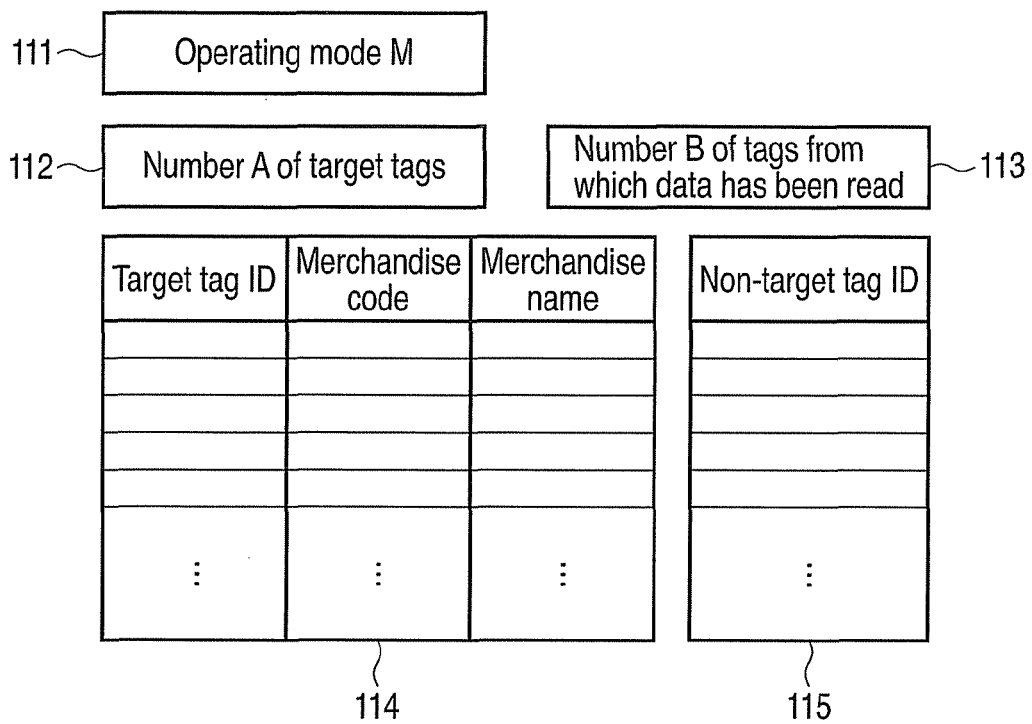
FIG. 5 is a diagram illustrating the major memory areas provided in the memory incorporated in the radio tag reading device.
Figure 6:
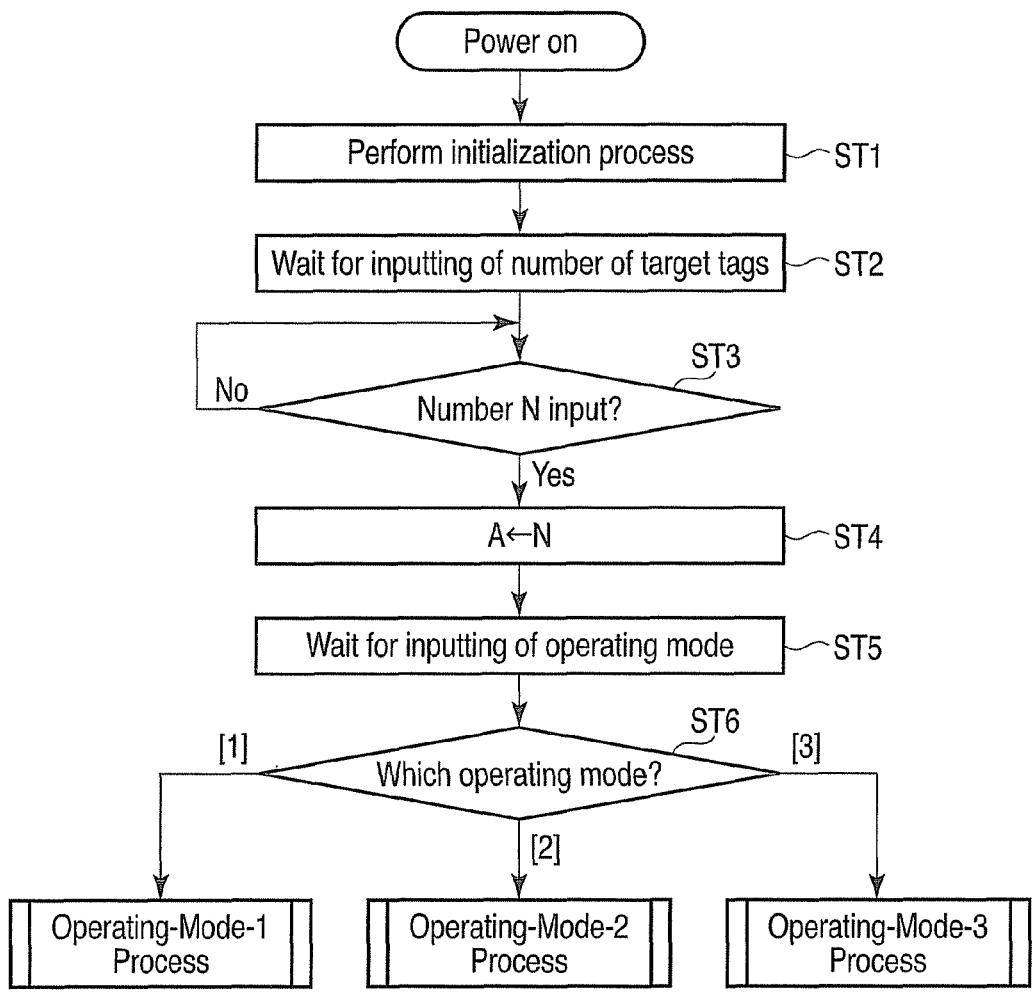
FIG. 6 is a flowchart explaining the sequence of steps the control unit of the radio tag reading device performs to execute a program.
Figure 7:
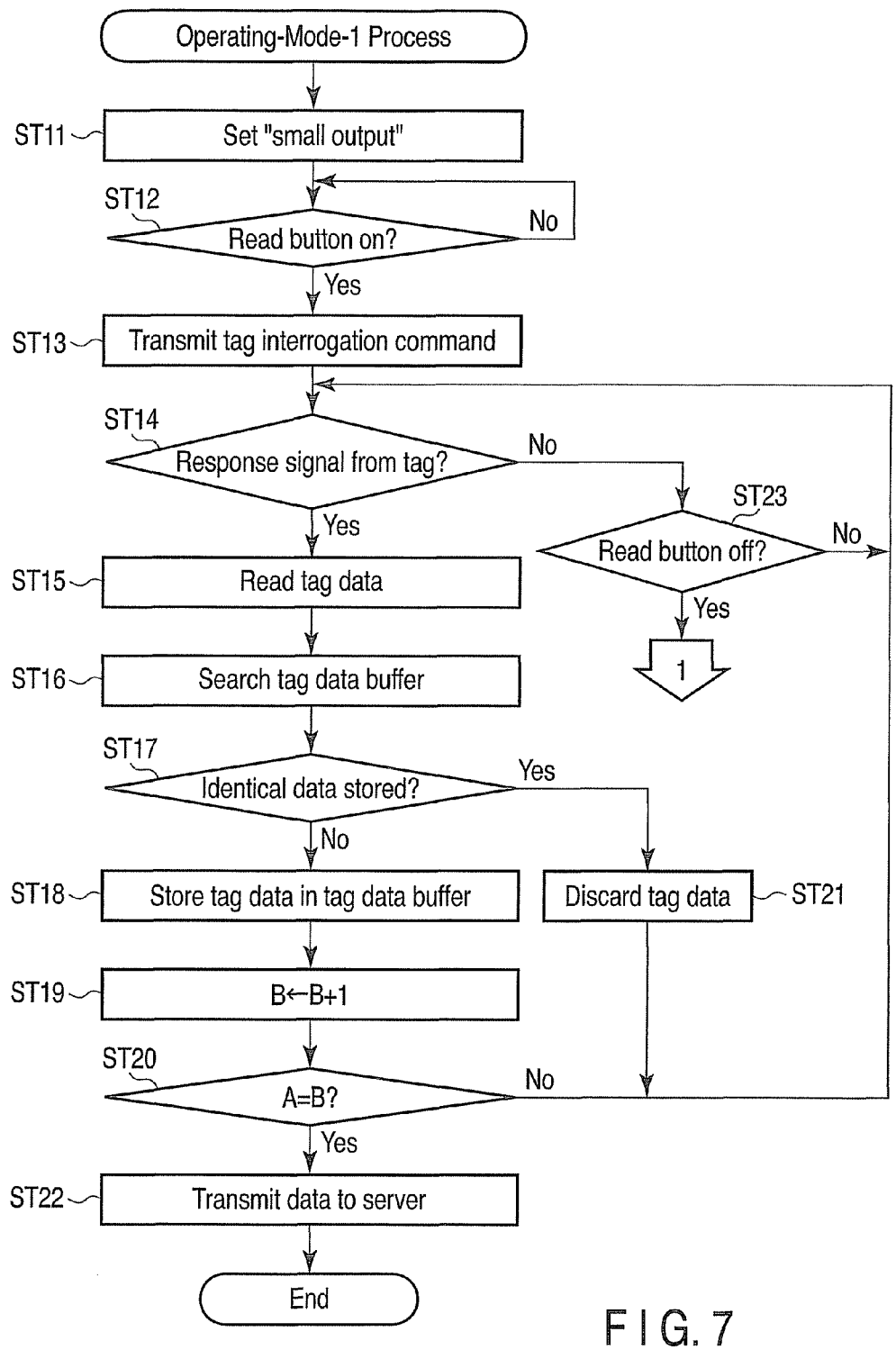
FIG. 7 is a flowchart explaining the sequence of some steps the control unit of the radio tag reading device performs in Operating-Mode-1 Process to execute the program.
Figure 8:
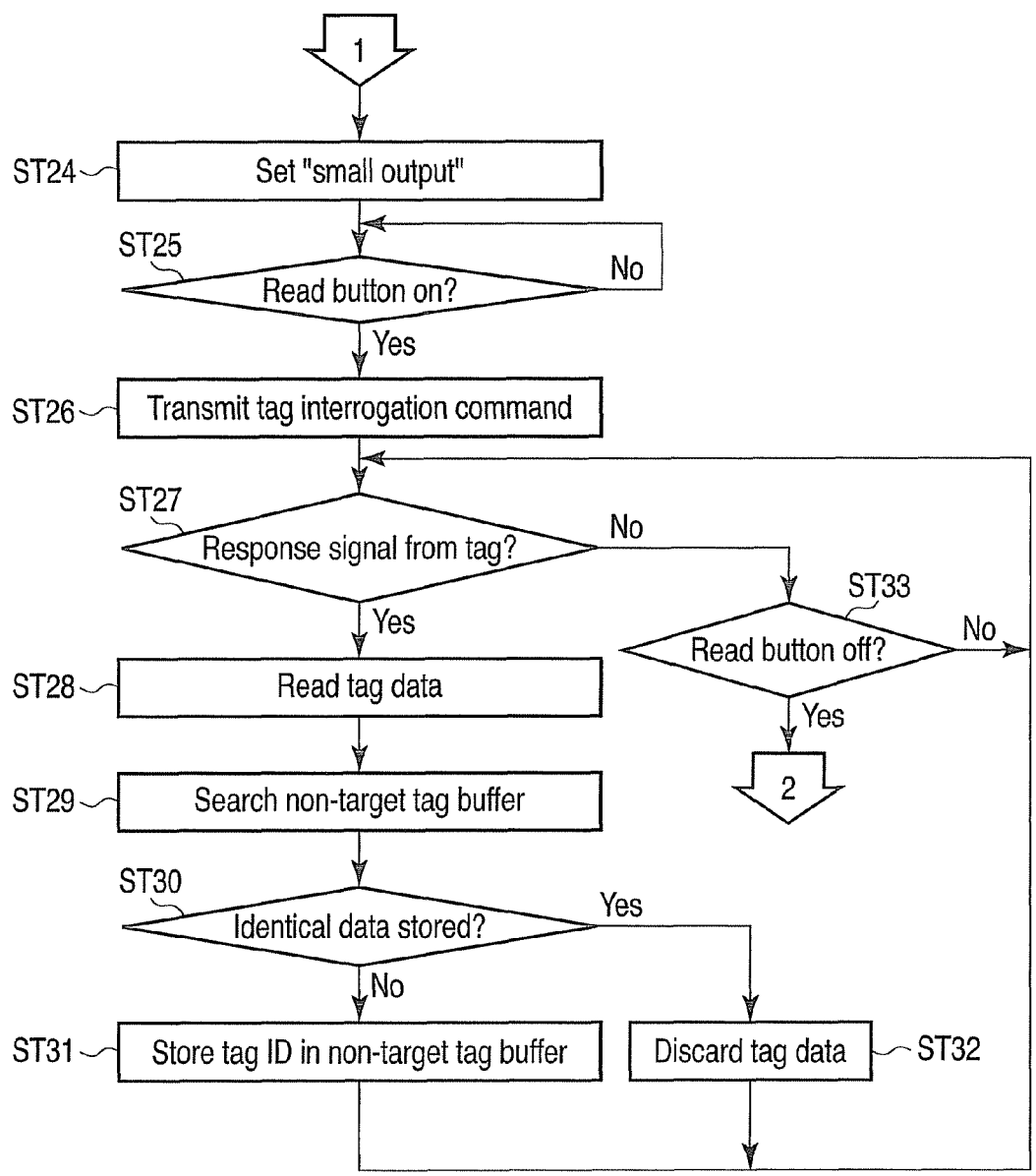
FIG. 8 is a flowchart explaining the sequence of some other steps the control unit of the radio tag reading device performs in Operating-Mode-1 Process to execute the program.
Figure 9:
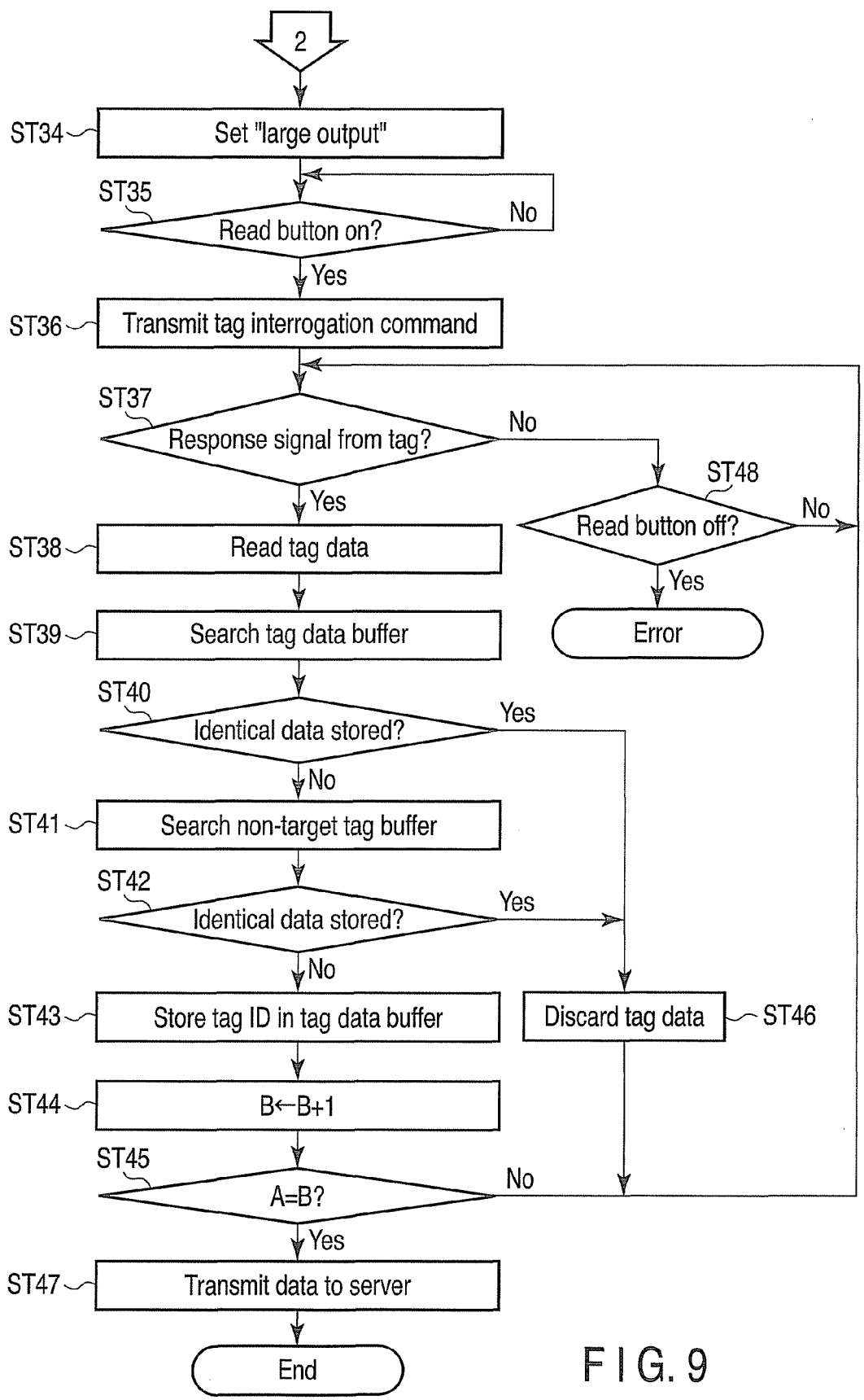
FIG. 9 is a flowchart explaining the sequence of the remaining steps the control unit of the radio tag reading device performs in Operating-Mode-1 Process to execute the program.

The control unit 82 has a memory 89. The memory 89 has work areas 111 to 115, all shown in FIG. 5.

The work area 111 is a set area for holding operating mode M. The work area 112 is a set area for holding the number A of target tags from which data should be read. The work area 113 is a count area for holding the number B of tags from which data has already been read.

The work area 114 is a buffer area for holding, one after another, the tag ID, merchandise code and merchandise name that constitute the tag data read from the storage unit 75 of the radio tag 5. This work area 114 constitutes a target tag storage unit.

Hereinafter, the work area 114 will be called "tag data buffer 114."

The work area 115 is a buffer area for holding tag ID, which is the identification data read from the storage unit 75 of the radio tag 5. This work area 115 constitutes a non-target tag storage unit. Therefore, the work area 115 will be called "non-target tag buffer 115."

The memory 89 stores a program that controls the operation of the control unit 82. In accordance with this program, the control unit 82 controls the other components of the radio tag reading device 1, as will be explained with reference to the flowcharts of FIG. 6 to FIG. 13. With reference to these flowcharts, it will be explained how a person in charge uses the radio tag reading device 1 to make an inventory, and how the radio tag reading device 1 operates.

The person in charge first pushes the power supply key 101 provided on the radio tag reading device 1.

When the power supply key 101 is pushed, the control unit 82 performs an initialization process in Step ST1. As a result, the work areas 111 to 115 of the memory 89 are cleared. In Step ST2, the control unit 82 causes the display unit 87 to display a message prompting the person to input the number N of tags from which to read data. In Step ST3, the control unit 82 determines whether the person in charge has input the number N.

The message displayed in Step S2 is, for example, "Please input the number of items of merchandise held in a shelf section, which are subjected to inventory." Radio tags 5 are attached to items of merchandise 4A to 4I, one to each item of merchandise. Hence, the number of items of merchandise subjected to inventory and held in each section is equal to the number of items of merchandise held in the section.

The person in charge first counts the items of merchandise held in the section for which inventory should be made, and then operates the numeric keypad 103. The number counted is thereby input. Assume that the section 3E of the shelf 2 shown in FIG. 14 is the target section for which an inventory should be made. (Note that as FIG. 14 shows, the shelf 2 has nine sections, i.e., 3 rows×3 columns.) In this case, the person in charge look into the section 3E, counting the number of items of merchandise 4E held in the section 3E, and operates the numeric keypad 103, inputting the number counted.

If the number N is input at the numeric keypad 103 (YES in Step ST3), the process goes to Step ST4. In Step ST4, the control unit 82 sets the number N in the set area 112, as number of target tags.

In Step ST5, the control unit 82 causes the display unit 87 to display a message prompting the person in charge to input an operation mode. In Step ST6, the control means 82 determines which operation mode has been selected.

The radio tag reading device 1 has first to three operating modes. The message displayed in Step S5 is, for example, "Push "1" to select the first operating mode, "2" to select the second operating mode, or "3" to select the third operating mode."

Thus, the person in charge of inventory operates the numeric keypad 103, inputting "1" in order to select the first operating mode, "2" in order to select the second operating mode, or "3" in order to select the third operating mode.

If "1" is input, the control means 82 performs Operating-Mode-1 Process that will be described later. If "2" is input, the control means 82 performs Operating-Mode-2 Process that will be described later. If "3" is input, the control means 82 performs Operating-Mode-3 Process that will be described later.

How Operating-Mode-1 Process, Operating-Mode-2 Process and Operating-Mode-3 Process are performed will be explained in detail. First, Operating-Mode-1 Process will be described with reference to FIG. 7 to FIG. 9.

When Operating-Mode-1 Process is selected, the control unit 82 transmits a setting signal of "small output" to the output switch unit 833 in Step ST11. On receiving this signal, the output switch unit 833 sets a "small" amplification factor to the transmission-amplification unit 832.

Next, in Step ST12, the control unit 82 determines whether the read button 88 has been pushed to input an on-signal.

The person in charge, who has selected the first operating mode, first holds the radio tag reading device 1, positioning the antenna 9 near the target section 3E. The person then pushes the read button 88. As a result, an on-signal is supplied from the read button 88 to the control unit 82.

On receiving the on-signal, the control unit 82 instructs the transmission unit 83 to transmit a tag interrogation command in Step ST13. In response to this command, the transmission unit 83 transmits, from the antenna 9, a carrier signal modulated in accordance with the tag interrogation command, namely, a so-called tag-interrogation radio signal. The tag-interrogation radio signal is a weak signal that travels for a short distance. This is because the signal amplification factor set to the transmission-amplification unit 832 has "small" output.

The radio tag 5 attached to any item of merchandise 4E held at the front part of the target section 3E can therefore receive the tag-interrogation radio signal. However, the radio tag 5 attached to any item of merchandise 4E held at the rear part of the section 3E and the radio tags 5 attached to the item of merchandise 4A, 4B, 4C, 4D, 4F, 4G, 4H and 4I held in the sections 3A, 3A, 3B, 3C, 3D, 3F, 3G, 3H and 3I cannot receive tag-interrogation radio signal.

Any radio tag 5 that has received the tag-interrogation radio signal transmits a response signal to the radio tag reading device 1. The response signal contains the ID stored in the ID area 75a of the storage unit 75. The antenna 9 of the radio tag reading device 1 receives the response signal. In the radio tag reading device 1, the reception unit 84 receives the response signal and demodulates the same.

After instructing the transmission unit 83 to transmit the tag interrogation command, the control unit 82 waits for a response signal coming from any radio tag 5, in Step ST14. On receiving the response signal (YES in Step ST14), the control unit 82 performs radio communication with the radio tag 5 that has transmitted the response signal. Thus, the radio tag reading device 1 reads the tag data containing a merchandise code and merchandise name, without contacting the radio tag 5.

Next, the control unit 82 searches the tag data buffer 114 in Step S16. In Step ST17, the control unit 82 determines whether the tag data buffer 114 stores data that is identical to the tag data acquired from the radio tag 5.

If the tag data buffer 114 does not store data that is identical to the tag data acquired from the radio tag 5 (NO in Step ST17), the control unit 82 stores the tag data acquired from the radio tag 5, in the tag data buffer 114 in Step ST18 (i.e., First Step).

After storing, in the tag data buffer 114, the tag data acquired from the radio tag 5 and not identical to any data stored in the tag data buffer 114, the control unit 82 increments, by "1," the number B of tags recorded in the count area 113, in Step ST19. In Step ST20, the control unit 82 compares the number B, thus counted, with the number A of target tags recorded in the set area 112. If the number B is smaller than the number A (NO in Step ST20), the control unit 82 will return to Step ST14, in which it waits for the next response signal.

In Step ST17, the tag data buffer 114 may be found to store data identical to the tag data acquired from the radio tag 5 (YES in Step ST17). If this is the case, the control unit 82 discards the data in Step ST21. Then, the control unit 82 returns to Step ST14 and waits for the next response signal.

Every time the control unit 82 receives a response signal in Step ST14, it repeats the sequence of Steps ST15 to ST19. When the number B becomes equal to the number A (YES in Step ST20), the control unit 82 acquires the tag data stored in the tag data buffer 114 in Step ST22. The tag data thus acquired is output to the POS server via the interface unit 81.

Assume that items of merchandise 4E are held at only the front part of the section 3E for which an inventory should be made. Then, the number B of tags from which data has been read may in all probability be equal to the number A of target tags. In this case, the tag data about the items of merchandise 4E held in the section 3E for which an inventory should be made is transmitted to the POS server as inventory data.

When the inventory data is transmitted to the POS server, the control unit 82 causes the display unit 87 to display a message, informing that the inventory data has been transmitted to the POS server. Reading this message, the person in charge of inventory can know that an inventory has been completed for the target section 3E.

The items of merchandise 4E may be held at the rear part of the target section 3E, as well as at the front part thereof. In this case, the number B of tags from which data has been read is smaller than number A of target tags. Hence, the display unit 87 does not display the message showing the completion of inventory data, over a given time. In this case, the person in charge releases the read button 88 from the pressed state.

In Step ST14, the control unit 82 waits for an on-signal coming from any radio tag 5. If a response signal comes (NO in Step ST14), the control unit 82 determines in Step ST23 whether the read button 88 no longer outputs an on-signal, or whether the read button 88 has been released. If the read button 88 no longer outputs an on-signal (YES in Step ST23), the control unit 82 goes to the process of Step ST24 shown in FIG. 8.

In Step ST24, the control unit 82 transmits a signal of "small" output to the output switch unit 833. On receiving this signal, the output switch unit 833 sets a "small" amplification factor to the transmission-amplification unit 832. In this state, the control unit 82 waits for an on-signal input at the read button 88, in Step ST25.

After releasing the read button 88 from the pressed state, the person in charge holds the radio tag reading device 1 and moves the same, positioning the antenna 9 near any one of the shelf sections 3A, 3B, 3C, 3D, 3F, 3G, 3H and 3I that hold the items of merchandise from which data need not be read. Then, the person pushes the read button 88 again.

While pushing the read button 88, the person in charge moves the radio tag reading device 1 clockwise or counterclockwise over the sections 3A, 3B, 3C, 3D, 3F, 3G, 3H and 3I that surrounds the section 3E for which an inventory should be made. For example, he or she may move the device 1 to the sections 3A, 3B, 3C, 3F, 3I, 3H, 3G, 3D and 3A, one after another in the order mentioned.

On receiving an on-signal from the read button 88, the control unit 82 instructs the transmission unit 83 to transmit a tag interrogation command in Step ST26. In response to this command, the transmission unit 83 transmits a tag-interrogation radio signal via the antenna 9. This tag-interrogation radio signal is a weak signal that travels for a short distance because the signal amplification factor set to the transmission-amplification unit 832 has "small" output.

Therefore, the radio tags 5 attached to the items of merchandise 4A, 4B, 4C, 4F, 4I, 4H, 4G and 4D that are held at the front parts of the sections 3A, 3B, 3C, 3F, 3I, 3H, 3G and 3D can receive the tag-interrogation radio signal. However, the radio tags 5 attached to the items of merchandise 4A, 4B, 4C, 4F, 4I, 4H, 4G and 4D that are held at the rear parts of the sections 3A, 3B, 3C, 3F, 3I, 3H, 3G and 3D cannot receive tag-interrogation radio signal. Neither can the items of merchandise 4E held at the section 3E for which an inventory should be made receive this tag-interrogation radio signal.

Any radio tag 5 that has received the tag-interrogation radio signal transmits a response signal containing the ID stored in the ID area 75a of the storage unit 75, to the radio tag reading device 1. The antenna 9 of the radio tag reading device 1 receives the response signal. In the radio tag reading device 1, the reception unit 84 receives the response signal and demodulates the same.

After instructing the transmission unit 83 to transmit the tag interrogation command, the control unit 82 waits for a response signal coming from any radio tag 5, in Step ST27. On receiving the response signal (YES in Step ST27), the control unit 82 performs radio communication with any radio tag 5 that has transmitted the response signal. Thus, the radio tag reading device 1 reads the tag data containing a merchandise code and merchandise name, without contacting the radio tag 5.

Next, the control unit 82 searches the non-target tag buffer 115 in Step S29. In Step ST30, the control unit 82 determines whether the non-target tag buffer 115 stores data whose ID is identical to that of the tag data acquired from the radio tag 5.

If the non-target tag buffer 115 does not store data whose ID is identical to that of the tag data acquired from the radio tag 5 (NO in Step ST30), the control unit 82 stores the ID of the tag data acquired from the radio tag 5, in the non-target tag buffer 115 in Step ST31 (i.e., Second Step). Thereafter, the control unit 82 returns to Step ST27 and waits for the next response signal coming.

In Step ST30, the non-target tag buffer 115 may be found to store data whose ID is identical to that of the tag data acquired from the radio tag 5 (YES in Step ST30). If this is the case, the control unit 82 discards the data in Step ST32. Then, the control unit 82 returns to Step ST27 and waits for the next response signal.

Every time the control unit 82 receives a response signal (YES in Step ST27), it performs Steps ST28, ST29, ST30 and ST31 or Steps ST28, ST29, ST30 and ST32. As a result, the IDs of the radio tags 5 attached to the items of merchandise 4A, 4B, 4C, 4F, 4I, 4H, 4G and 4D that are held at the front parts of the sections 3A, 3B, 3C, 3F, 3I, 3H, 3G and 3D are stored in the non-target tag buffer 115.

While pushing the read button 88, the person in charge moves the radio tag reading device 1 clockwise or counterclockwise over the sections 3A, 3B, 3C, 3D, 3F, 3G, 3H and 3I that surrounds the section 3E for which an inventory should be made. When the person finishes moving the device 1 around the section 3E, at least once, over the other shelf sections, he or she releases the read button 88 from the pressed state.

While waiting for a response signal coming from any radio tag in Step ST27, the control unit 82 continuously monitors the on-signal coming from the read button 88, in Step ST33. The on-signal ceases when the read button 88 is released from the pressed state. That is, in Step ST33, the control unit 82 determines whether the read button 88 has been released. If the on-signal has ceased (YES in Step ST33), the control unit 82 goes to Step ST34 shown in FIG. 9.

In Step ST34, the control unit 82 transmits a signal of "large" output to the output switch unit 833. On receiving this signal, the output switch unit 833 sets a "large" amplification factor to the transmission-amplification unit 832. The control unit 82 then waits for an on-signal input at the read button 88, in Step ST35. That is, the control unit 82 determines in Step ST35 whether the read button 88 has been pushed.

After releasing the read button 88 from the pressed state, the person in charge holds the radio tag reading device 1 and moves the same, again positioning the antenna 9 near the shelf section 3E for which an inventory should be made. Then, the person pushes the read button 88. As a result, an on-signal is supplied from the read button 88 to the control unit 82.

On receiving this on-signal, the control unit 82 instructs the transmission unit 83 to transmit a tag interrogation command in Step ST36. In response to this command, the transmission unit 83 transmits a tag-interrogation radio signal via the antenna 9. This tag-interrogation radio signal is a strong signal that travels for a long distance because the signal amplification factor set to the transmission-amplification unit 832 has "large" output.

Therefore, not only the radio tags 5 attached to the items of merchandise 4E held at the front part of the section 3E for which an inventory should be made, but also the items of merchandise 4E held at the rear part of the section 3E may receive the tag-interrogation radio signal in all probability. However, the radio tags 5 attached to the items of merchandise 4A, 4B, 4C, 4D, 4F, 4G, 4H and 4I held at the front parts of the sections 3A, 3B, 3C, 3D, 3F, 3G, 3H and 3I may receive the tag-interrogation radio signal, too.

Any radio tag 5 that has received the tag-interrogation radio signal transmits a response signal containing the ID stored in the ID area 75a of the storage unit 75, to the radio tag reading device 1. The antenna 9 of the radio tag reading device 1 receives the response signal. In the radio tag reading device 1, the reception unit 84 receives the response signal and demodulates the same.

After instructing the transmission unit 83 to transmit the tag interrogation command, the control unit 82 waits for a response signal coming from any radio tag 5, in Step ST37. On receiving the response signal (YES in Step ST37), the control unit 82 performs radio communication with any radio tag 5 that has transmitted the response signal, in Step ST38. Thus, the radio tag reading device 1 acquires the tag data containing a merchandise code and merchandise name.

Next, the control unit 82 searches the tag data buffer 114 in Step S39. In Step ST40, the control unit 82 determines whether the tag data buffer 114 stores data that is identical to the tag data acquired from the radio tag 5.

If the tag data buffer 114 has yet to store data that is identical to the tag data acquired from the radio tag 5 (NO in Step ST40), the control unit 82 searches the non-target tag buffer 115, in Step ST41. In Step ST42, the control unit 82 determines whether the non-target tag buffer 115 stores ID is identical to that of the tag data acquired from the radio tag 5.

If the non-target tag buffer 115 does not store ID identical to that of the tag data acquired from the radio tag 5 (NO in Step ST42), the control unit 82 stores the tag data acquired from the radio tag 5, in the tag data buffer 114 in Step ST43 (i.e., Third Step).

After storing, in the tag data buffer 114, the tag data not identical to any data stored in the tag data buffer 114 or non-target tag buffer 115, the control means 82 increments, by "1," the number B of tags from which data has been read, in Step ST44. In Step ST45 the control unit 82 compares the number B, thus counted, with the number A of target tags. If the number B is smaller than the number A (NO in Step ST45), the control unit 82 will return to Step ST37, in which it waits for the next response signal.

In Step ST40, the tag data buffer 114 may be found to store data that is identical to the tag data acquired from the radio tag 5. Similarly, in Step ST42, the non-target tag buffer 115 may be found to store ID identical to that of the tag data acquired from the radio tag 5. In either case, the control unit 82 discards the tag data in Step ST46. Then, the control unit 82 returns to Step ST37 and waits for the next response signal.

Thus, the tag data stored in First Step in the tag data buffer 114, i.e., the data of the radio tag 5 attached to any item of merchandise 4E held at the front part of the shelf section 3E, is discarded in Third Step, not remaining stored in the tag data buffer 114. The tag data stored in Second Step in the non-target tag buffer 115, i.e., the data items of the radio tags 5 attached to the items of merchandise 4A, 4B, 4C, 4F, 4I, 4H, 4G and 4D held in the selections 3A, 3B, 3C, 3F, 3I, 3H, 3G and 3D, are discarded, too, in Third Step, not remaining stored in the non-target tag buffer 115.

Every time the control unit 82 receives a response signal (YES in Step ST37), it performs Steps ST38 to ST44. If the number B of tags from which data has been read is equal to the number A of target tags (YES in Step ST45), the control means 82 acquires the tag data stored in the tag data buffer 114 in Step ST47. The tag data thus acquired is output to the POS server via the interface unit 81.

When the device 1 receives the data of the radio tags attached to all items of merchandise 4E held at the rear part of the section 3E for which an inventory should be made, the number B of tags from which data has been read becomes equal to the number A of target tags. At this point, the tag data about the items of merchandise 4E held in the section 3E is transmitted, as inventory data, to the POS server. When the inventory data is transmitted to the POS server, the control unit 82 causes the display unit 87 to display a message, informing that the inventory data has been transmitted to the POS server. Reading this message, the person in charge of inventory can know that an inventory has been completed for the section 3E as desired.

Assume that a radio tag lies very close to another radio tag in the section 3E, making it difficult to read tag data from at least one of the radio tag attached to the items of merchandise 4E. Then, the number B of tags from which data has been read is smaller than the number A of target tags. Consequently, the display unit 87 does not display the message showing the completion of inventory data, over a given time. In this case, the person in charge releases the read button 88 from the pressed state.

While waiting for a response signal coming from any radio tag in Step ST37, the control unit 82 continuously monitors the on-signal coming from the read button 88, in Step ST48. The on-signal ceases when the read button 88 is released from the pressed state. If the on-signal has ceased (YES in Step ST48), the control unit 82 causes the display unit 87 to display an error message.

Thus, the person in charge, who has selected the first operating mode, holds the radio tag reading device 1, positioning the antenna 9 near the section 3E and reading data from the radio tags 5 attached to the items of merchandise held in the section 3E. Next, the person moves the device 1 clockwise or counterclockwise over the sections 3A, 3B, 3C, 3D, 3F, 3G, 3H and 3I that surrounds the section 3E, reading data from the radio tags 5 attached to the items of merchandise held in these sections. Finally, the person positions the antenna 9 at the section 3E, thereby reading data from the radio tags 5 attached to the items of merchandise 4E held in the section 3E.

Performing First Step, Second Step and Third Step, all described above, the radio tag reading device 1 can output, to the POS server, the data stored in the radio tags 5 attached to all items of merchandise 4E held in the section 3E of the shelf 2.

Figure 10:
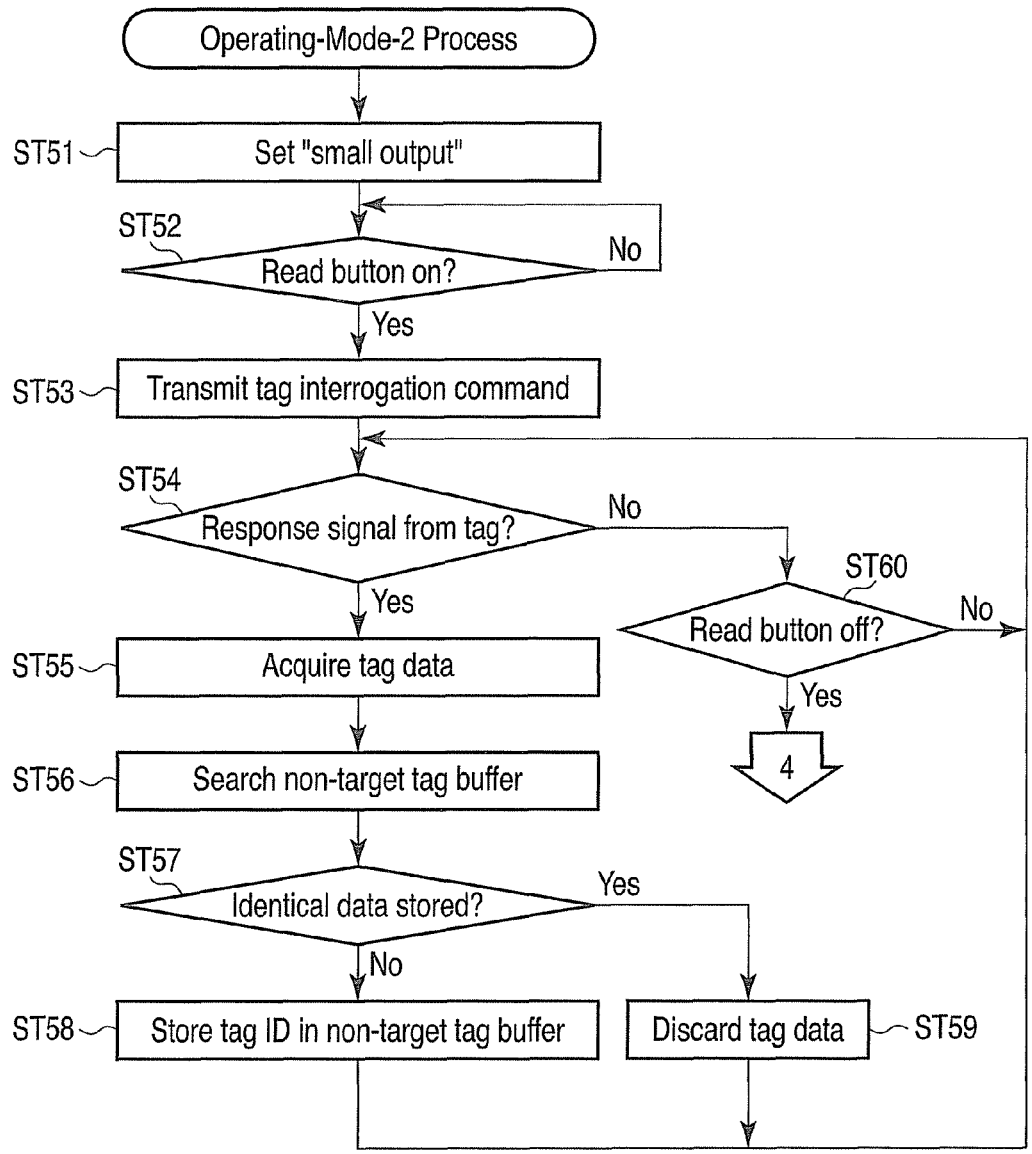
FIG. 10 is a flowchart explaining the sequence of some steps the control unit of the radio tag reading device performs in Operating-Mode-2 Process to execute the program.
Figure 11:
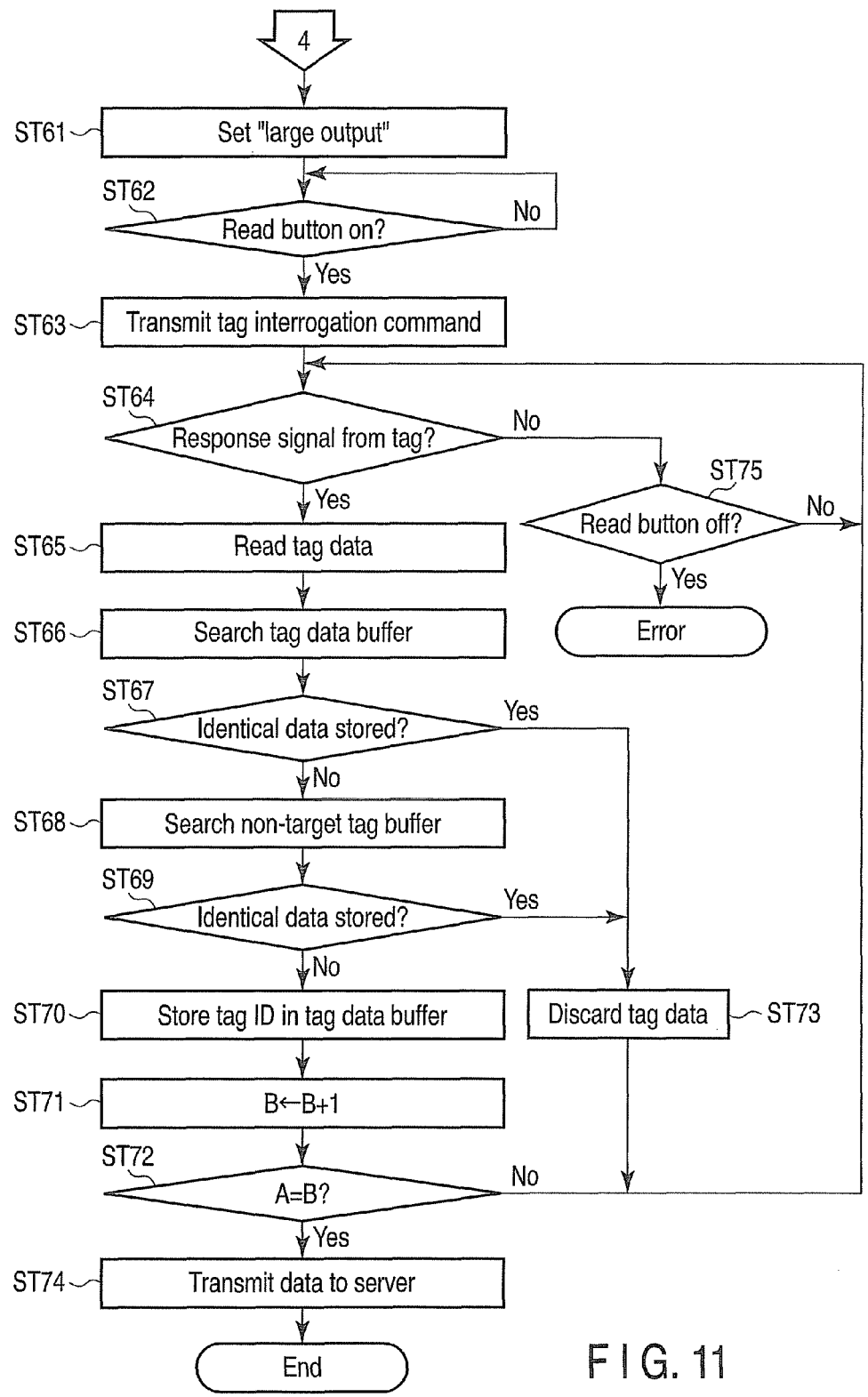
FIG. 11 is a flowchart explaining the sequence of the other steps the control unit of the radio tag reading device performs in Operating-Mode-2 Process to execute the program.

Operating-Mode-2 Process will be explained with reference to FIG. 10 and FIG. 11.

When Operating-Mode-2 Process is selected, the control unit 82 transmits a setting signal of "small output" to the output switch unit 833 in Step ST51. On receiving this signal, the output switch unit 833 sets a "small" amplification factor to the transmission-amplification unit 832. In Step ST52, the control unit 82 waits for an on-signal coming from the read button 88.

The person in charge, who has selected Operating-Mode-2 Process, first holds the radio tag reading device 1, positioning the antenna 9 near any one of the shelf sections 3A, 3B, 3C, 3D, 3F, 3G, 3H and 3I for which an inventory need not be made. Then, the person pushes the read button 88. While pushing the read button 88, the person in charge moves the radio tag reading device 1 clockwise or counterclockwise over the sections 3A, 3B, 3C, 3D, 3F, 3G, 3H and 3I for which an inventory need not be made. For example, he or she may move the device 1, sections 3A, 3B, 3C, 3F, 3I, 3H, 3G, 3D and 3A, one after another in the order mentioned.

When pushed, the read button 88 generates an on-signal, which is supplied to the control unit 82. On receiving the on-signal from the read button 88 (YES in Step ST52), the control unit 82 instructs the transmission unit 83 to transmit a tag interrogation command in ST53. In response to this command, the transmission unit 83 transmits a tag-interrogation radio signal via the antenna 9. This tag-interrogation radio signal is a weak signal that travels for a short distance because the signal amplification factor set to the transmission-amplification unit 832 has "small" output.

Therefore, the radio tags 5 attached to the items of merchandise 4A, 4B, 4C, 4F, 4I, 4H, 4G and 4D that are held at the front parts of the sections 3A, 3B, 3C, 3F, 3I, 3H, 3G and 3D can receive the tag-interrogation radio signal. However, the radio tags 5 attached to the items of merchandise 4A, 4B, 4C, 4F, 4I, 4H, 4G and 4D that are held at the rear parts of the sections 3A, 3B, 3C, 3F, 3I, 3H, 3G and 3D cannot receive tag-interrogation radio signal. Neither can the radio tag 5 attached to the items of merchandise 4E held at the rear part of the section 3E for which an inventory should be made receive the tag-interrogation radio signal.

Any radio tag 5 that has received the tag-interrogation radio signal transmits a response signal containing the ID stored in the ID area 75a of the storage unit 75, to the radio tag reading device 1. The antenna 9 of the radio tag reading device 1 receives the response signal. In the radio tag reading device 1, the reception unit 84 receives the response signal and demodulates the same.

After instructing the transmission unit 83 to transmit the tag interrogation command, the control unit 82 waits for a response signal coming from any radio tag 5, in Step ST54. On receiving the response signal (YES in Step ST54), the control unit 82 performs radio communication with any radio tag 5 that has transmitted the response signal. Thus, the radio tag reading device 1 reads the tag data containing a merchandise code, without contacting the radio tag 5.

Next, the control unit 82 searches the non-target tag buffer 115 in Step ST56. In Step ST57, the control unit 82 determines whether the non-target tag buffer 115 stores ID identical to that of the tag data acquired from the radio tag 5.

If the non-target tag buffer 115 has yet to store ID identical to that of the tag data acquired from the radio tag 5 (NO in Step ST57), the control unit 82 stores the ID of the tag data acquired from the radio tag 5, in the non-target tag buffer 115, in Step ST58 (i.e., First Step). Thereafter, the control unit 82 returns to Step ST54 and waits for the next response signal coming.

In Step ST57, the non-target tag buffer 115 may be found to store data whose ID is identical to that of the tag data acquired from the radio tag 5 (YES in Step ST57). If this is the case, the control unit 82 discards the data in Step ST59. Then, the control unit 82 returns to Step ST54 and waits for the next response signal.

Every time the control unit 82 receives a response signal (YES in Step ST54), it performs Steps ST55, ST56, ST57 and ST58 or Steps ST55, ST56, ST57 and ST59. As a result, the IDs of the radio tags 5 attached to the items of merchandise 4A, 4B, 4C, 4F, 4I, 4H, 4G and 4D that are held at the front parts of the sections 3A, 3B, 3C, 3F, 3I, 3G, 3H and 3D are stored in the non-target tag buffer 115.

While pushing the read button 88, the person in charge moves the radio tag reading device 1 clockwise or counter-clockwise over the sections 3A, 3B, 3C, 3D, 3F, 3G, 3H and 3I that surrounds the section 3E holding the items of merchandise 4E from which to read data. When the person finishes moving the device 1 around the section 3E, at least once, over the other shelf sections, he or she releases the read button 88 from the pressed state.

While waiting for a response signal coming from any radio tag in Step ST54, the control unit 82 continuously monitors the on-signal coming from the read button 88, in Step ST60. The on-signal ceases when the read button 88 is released from the pressed state. If the on-signal has ceased (YES in Step ST60), the control unit 82 goes to Step ST61 shown in FIG. 11.

In Step ST61, the control unit 82 transmits a signal of "large" output to the output switch unit 833. On receiving this signal, the output switch unit 833 sets a "large" amplification factor to the transmission-amplification unit 832. The control unit 82 then waits for an on-signal input at the read button 88, in Step ST62. That is, the control unit 82 determines in Step ST62 whether the read button 88 has been pushed.

After releasing the read button 88 from the pressed state, the person in charge holds the radio tag reading device 1 and moves the same, positioning the antenna 9 near the shelf section 3E for which an inventory should be made. Then, the person pushes the read button 88 again. As a result, an on-signal is supplied from the read button 88 to the control unit 82.

On receiving this on-signal (YES in Step ST62), the control unit 82 instructs the transmission unit 83 to transmit a tag interrogation command in Step ST63. In response to this command, the transmission unit 83 transmits a tag-interrogation radio signal via the antenna 9. This tag-interrogation radio signal is a strong signal that travels for a long distance because the signal amplification factor set to the transmission-amplification unit 832 has "large" output.

Therefore, the radio tags 5 attached to all items of merchandise 4E held in the section 3E may receive the tag-interrogation radio signal in all probability. However, the radio tags 5 attached to the items of merchandise 4A, 4B, 4C, 4D, 4F, 4G, 4H and 4I held at the front parts of the sections 3A, 3B, 3C, 3D, 3F, 3G, 3H and 3I may receive this tag-interrogation radio signal, too.

Any radio tag 5 that has received this tag-interrogation radio signal transmits a response signal containing the ID stored in the ID area 75a of the storage unit 75, to the radio tag reading device 1. The antenna 9 of the radio tag reading device 1 receives the response signal. In the radio tag reading device 1, the reception unit 84 receives the response signal and demodulates the same.

After instructing the transmission unit 83 to transmit the tag interrogation command, the control unit 82 waits for a response signal coming from any radio tag 5, in Step ST64. On receiving the response signal (YES in Step ST64), the control unit 82 performs radio communication with any radio tag 5 that has transmitted the response signal, in Step ST65. Thus, the radio tag reading device 1 acquires the tag data containing a merchandise code and merchandise name.

Next, the control unit 82 searches the tag data buffer 114 in Step S66. In Step ST67, the control unit 82 determines whether the tag data buffer 114 stores data that is identical to the tag data acquired from the radio tag 5.

If the tag data buffer 114 has yet to store data that is identical to the tag data acquired from the radio tag 5 (NO in Step ST67), the control unit 82 searches the non-target tag buffer 115, in Step ST68. In Step ST69, the control unit 82 determines whether the non-target tag buffer 115 stores ID is identical to that of the tag data acquired from the radio tag 5.

If the non-target tag buffer 115 does not store ID identical to that of the tag data acquired from the radio tag 5 (NO in Step ST69), the control unit 82 stores the tag data acquired from the radio tag 5, in the tag data buffer 114 in Step ST70 (i.e., Second Step).

After storing, in the tag data buffer 114, the tag data not identical to any data stored in the tag data buffer 114 or non-target tag buffer 115, the control means 82 increments, by "1," the number B of tags from which data has been read, in Step ST71. In Step ST72, the control unit 82 compares the number B, thus counted, with the number A of target tags. If the number B is smaller than the number A (NO in Step ST72), the control unit 82 will return to Step ST64, in which it waits for the next response signal.

In Step ST67, the tag data buffer 114 may be found to store data that is identical to the tag data acquired from the radio tag 5. Similarly, in Step ST69, the non-target tag buffer 115 may be found to store ID identical to that of the tag data acquired from the radio tag 5. In either case, the control unit 82 discards the tag data in Step ST73. Then, the control unit 82 returns to Step ST64 and waits for the next response signal.

Thus, the tag data stored in First Step in the non-target tag buffer 115, i.e., the data items of the radio tags 5 attached to the items of merchandise 4A, 4B, 4C, 4F, 4I, 4H, 4G and 4D held in the selections 3A, 3B, 3C, 3F, 3I, 3H, 3G and 3D for which an inventory need not be made, are discarded, too, in Second Step, not remaining stored in the tag data buffer 114.

Every time the control unit 82 receives a response signal (YES in Step ST64), it performs Steps ST65 to ST71. If the number B is equal to the number A (YES in Step ST72), the control means 82 acquires the tag data stored in the tag data buffer 114. The tag data thus acquired is output to the POS server via the interface unit 81.

When the device 1 receives the data of the radio tags attached to all items of merchandise 4E held in the section 3E for which an inventory should be made, the number B of tags from which data has been read becomes equal to the number A of tags from which data should be read. At this point, the tag data about the items of merchandise 4E held in the section 3E is transmitted, as inventory data, to the POS server.

When the inventory data is transmitted to the POS server, the control unit 82 causes the display unit 87 to display a message, informing that the inventory data has been transmitted to the POS server. Reading this message, the person in charge of inventory can know that an inventory has been completed for the section 3E as desired.

Assume that a radio tag lies very close to another radio tag in the section 3E, making it difficult to read tag data from at least one of the radio tag attached to the items of merchandise 4E. Then, the number B of tags from which data has been read is smaller than the number A of tags from which data should be read. Consequently, the display unit 87 does not display the message showing the completion of inventory data, over a given time. In this case, the person in charge releases the read button 88 from the pressed state.

While waiting for a response signal coming from any radio tag in Step ST64, the control unit 82 continuously monitors the on-signal coming from the read button 88, in Step ST75. The on-signal ceases when the read button 88 is released from the pressed state. That is, in Step ST75, the control unit 82 determines whether the read button 88 has been released. If the on-signal has ceased (YES in Step ST75), the control unit 82 causes the display unit 87 to display an error message.

Thus, the person in charge, who has selected the second operating mode, first holds the radio tag reading device 1 and moves the device 1 clockwise or counterclockwise over the sections 3A, 3B, 3C, 3D, 3F, 3G, 3H and 3I for which an inventory need not be made, reading data from the radio tags 5 attached to the items of merchandise held in the sections 3A, 3B, 3C, 3D, 3F, 3G, 3H and 3I for which an inventory need not be made. Next, positioning the antenna 9 near the section 3E and reading data from the radio tags 5 attached to the items of merchandise held in the section 3E. Data is thereby read from the radio tags 5 attached to the items of merchandise 4E held in the section 3E for which an inventory should be made.

Performing these two steps described above, the radio tag reading device 1 can output, to the POS server, the data stored in the radio tags 5 attached to all items of merchandise 4E held in the section 3E of the shelf 2. Moreover, in the second operating mode, the number of steps performed is smaller than in the first operating mode. Hence, the process efficiency can be higher than in the first operating mode.

Figure 12:
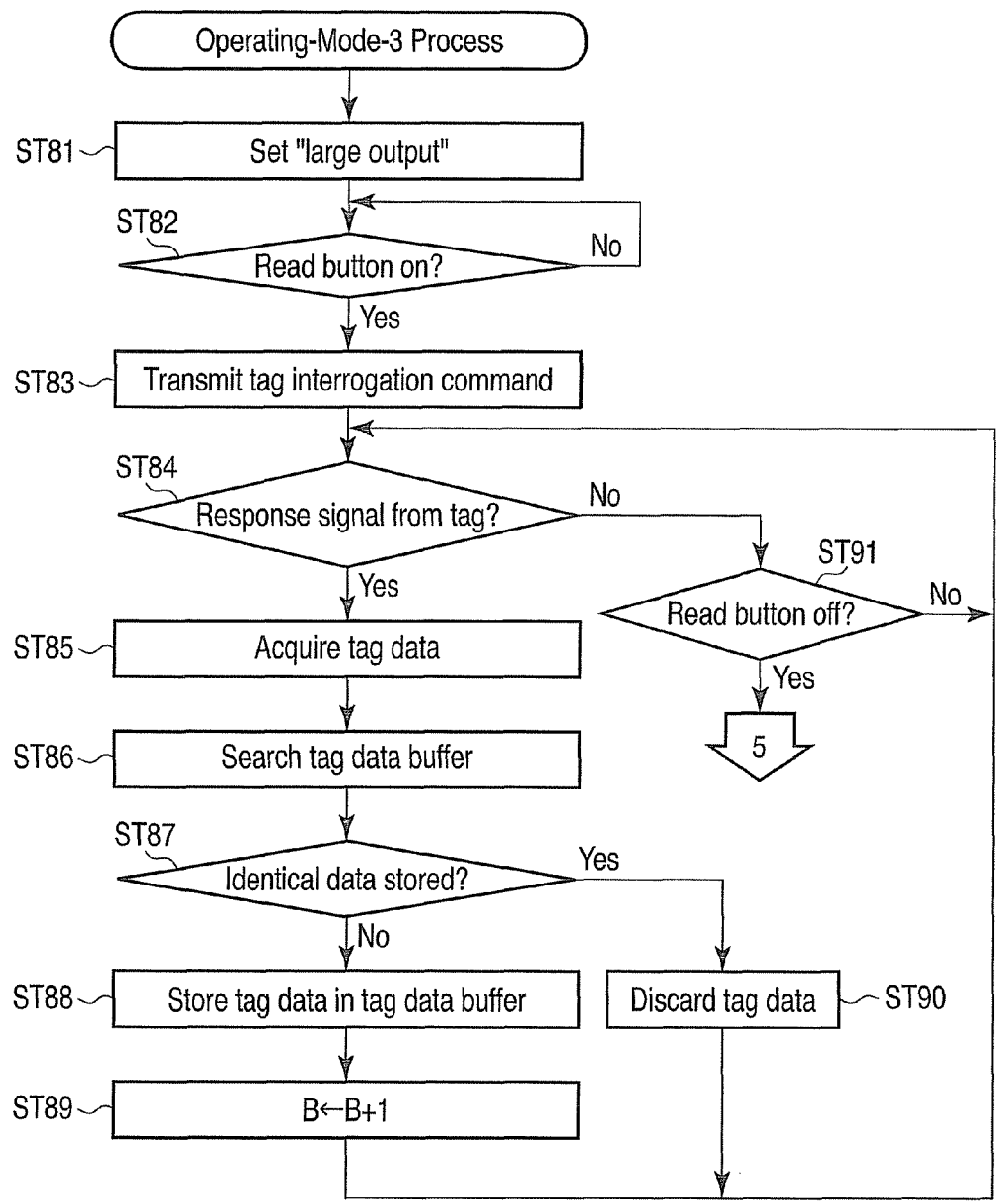
FIG. 12 is a flowchart explaining the sequence of some steps the control unit of the radio tag reading device performs in Operating-Mode-3 Process to execute the program.
Figure 13:
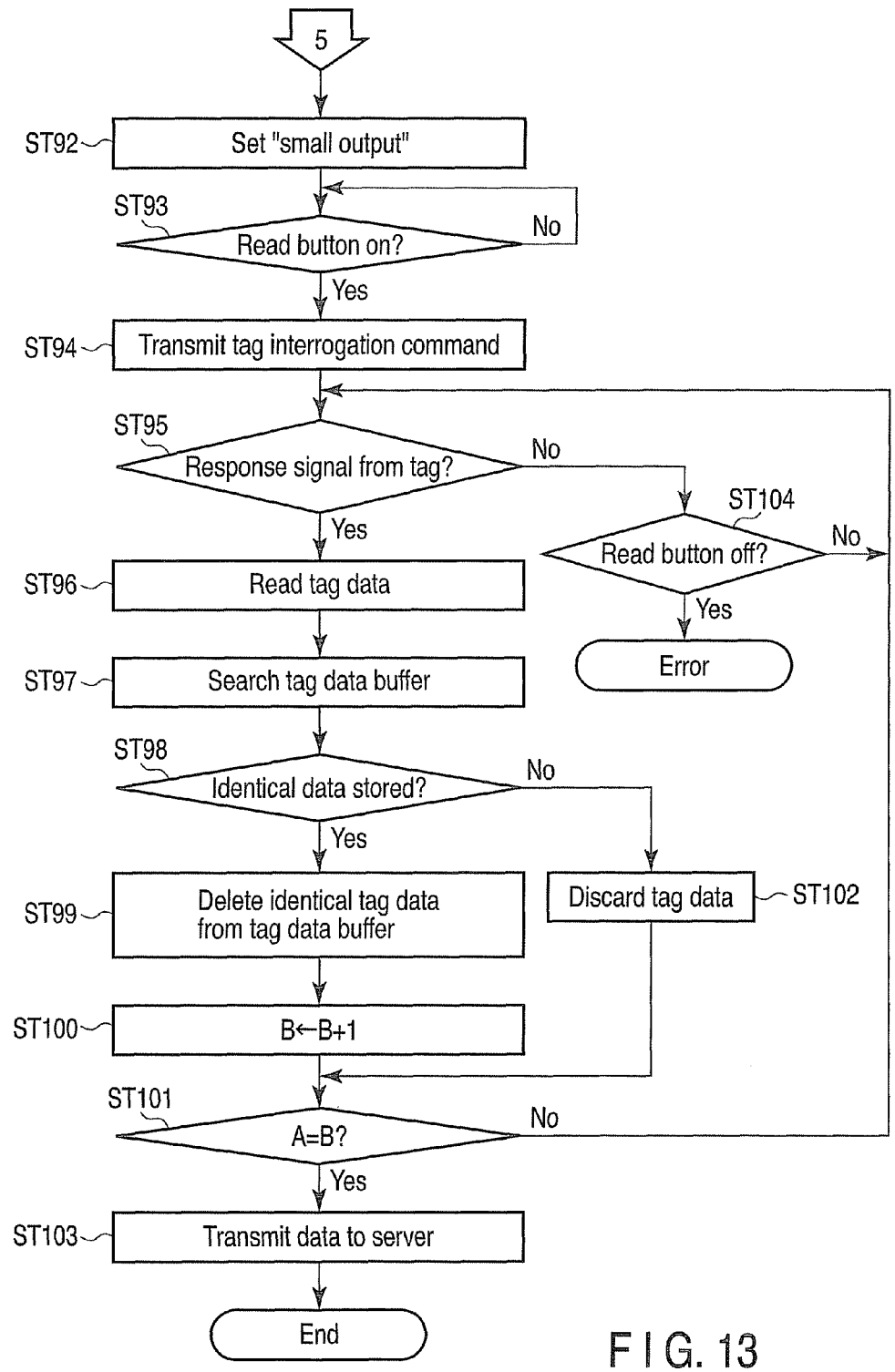
FIG. 13 is a flowchart explaining the sequence of the other steps the control unit of the radio tag reading device performs in Operating-Mode-3 Process to execute the program.

Operating-Mode-3 Process will be explained with reference to FIG. 12 and FIG. 13. When Operating-Mode-3 Process is selected, the control unit 82 transmits a setting signal of "large output" to the output switch unit 833 in Step ST81. On receiving this signal, the output switch unit 833 sets a "large" amplification factor to the transmission-amplification unit 832. In Step ST82, the control unit 82 waits for an on-signal coming from the read button 88.

The person in charge, who has selected Operating-Mode-3 Process, first holds the radio tag reading device 1, positioning the antenna 9 near the section 3E for which an inventory should be made. The person then pushes the read button 88. As a result, an on-signal is supplied from the read button 88 to the control unit 82.

On receiving this on-signal (YES in Step ST82), the control unit 82 instructs the transmission unit 83 to transmit a tag interrogation command, in Step ST83. In response to this command, the transmission unit 83 transmits a tag-interrogation radio signal via the antenna 9. This tag-interrogation radio signal is a strong signal that travels for a long distance because the signal amplification factor set to the transmission-amplification unit 832 has "large" output.

Therefore, the radio tags 5 attached to all items of merchandise 4E held in the section 3E may receive the tag-interrogation radio signal in all probability. However, the radio tags 5 attached to the items of merchandise 4A, 4B, 4C, 4D, 4F, 4G, 4H and 4I held at the front parts of the sections 3A, 3B, 3C, 3D, 3F, 3G, 3H and 3I for which an inventory need not be made may receive this tag-interrogation radio signal, too.

Any radio tag 5 that has received this tag-interrogation radio signal transmits a response signal containing the ID stored in the ID area 75a of the storage unit 75, to the radio tag reading device 1. The antenna 9 of the radio tag reading device 1 receives the response signal. In the radio tag reading device 1, the reception unit 84 receives the response signal and demodulates the same.

After instructing the transmission unit 83 to transmit the tag interrogation command, the control unit 82 waits for a response signal coming from any radio tag 5, in Step ST84. That is, the control unit 82 determines whether the response signal has arrived. On receiving the response signal (YES in Step ST84), the control unit 82 performs radio communication with any radio tag 5 that has transmitted the response signal, in Step ST85. Thus, the radio tag reading device 1 acquires the tag data containing a merchandise code.

Next, the control unit 82 searches the tag data buffer 114 in Step S86. In Step ST87, the control unit 82 determines whether the tag data buffer 114 stores data that is identical to the tag data acquired from the radio tag 5.

If the tag data buffer 114 has yet to store data that is identical to the tag data acquired from the radio tag 5 (NO in Step ST87), the control unit 82 stores the tag data acquired from the radio tag 5 in the tag buffer 114, in Step ST88 (i.e., First Step).

After storing, in the tag data buffer 114, the tag data not identical to any data stored in the tag data buffer 114, the control unit 82 increments, by "1," the number B of tags from which data has been read, in Step ST89. Thereafter, the control unit 82 returns to Step ST84 and waits for the next response signal coming.

In Step ST87, the non-target tag buffer 115 may be found to store data that is identical to the tag data acquired from the radio tag 5 (YES in Step ST87). If this is the case, the control unit 82 discards the data in Step ST90. Then, the control unit 82 returns to Step ST84 and waits for the next response signal.

Every time the control unit 82 receives a response signal (YES in Step ST84), it performs Steps ST85 to ST90. While waiting for a response signal coming from any radio tag in Step ST84, the control unit 82 continuously monitors the on-signal coming from the read button 88, in Step ST91. The on-signal ceases when the read button 88 is released from the pressed state. If the on-signal has ceased (YES in Step ST91), the control unit 82 causes the display unit 92 shown in FIG. 13, to display an error message.

In Step ST92, the control unit 82 transmits a setting signal of "small output" to the output switch unit 833. On receiving this signal, the output switch unit 833 sets a "small" amplification factor to the transmission-amplification unit 832. In Step ST93, the control unit 82 waits for an on-signal coming from the read button 88.

The person in charge, who has released the read button from the pressed state, he or she holds the radio tag reading device 1 and moves the same, positioning the antenna 9 near any one of the shelf sections 3A, 3B, 3C, 3D, 3F, 3G, 3H and 3I for which an inventory need not be made. Then, the person pushes the read button 88. While pushing the read button 88, the person in charge moves the radio tag reading device 1 clockwise or counterclockwise over the sections 3A, 3B, 3C, 3D, 3F, 3G, 3H and 3I that surrounds the section 3E holding the items of merchandise 4E from which to read data. For example, he or she may move the device 1 to the sections 3A, 3B, 3C, 3D, 3F, 3I, 3H, 3G, 3D and 3A, one after another, in the order mentioned (in the clockwise direction).

On receiving this on-signal coming from the read button 88 (YES in ST93), the control unit 82 instructs the transmission unit 83 to transmit a tag interrogation command, in Step ST94. In response to the interrogation command, the transmission unit 83 transmits a tag-interrogation radio signal via the antenna 9. This tag-interrogation radio signal is a strong signal that travels for a short distance because the signal amplification factor set to the transmission-amplification unit 832 has "small" output.

Therefore, the radio tags 5 attached to the items of merchandise 4A, 4B, 4C, 4F, 4I, 4H, 4G and 4D that are held at the front parts of the sections 3A, 3B, 3C, 3F, 3I, 3H, 3G and 3D can receive the tag-interrogation radio signal. However, the radio tags 5 attached to the items of merchandise 4E held in the section 3E for which an inventory should be made cannot receive the tag-interrogation radio signal.

Any radio tag 5 that has received this tag-interrogation radio signal transmits a response signal containing the ID stored in the ID area 75a of the storage unit 75, to the radio tag reading device 1. The antenna 9 of the radio tag reading device 1 receives the response signal. In the radio tag reading device 1, the reception unit 84 receives the response signal and demodulates the same.

After instructing the transmission unit 83 to transmit the tag interrogation command, the control unit 82 waits for a response signal coming from any radio tag 5, in Step ST95. That is, the control unit 82 determines whether the response signal has arrived. On receiving the response signal (YES in Step ST95), the control unit 82 performs radio communication with any radio tag 5 that has transmitted the response signal, in Step ST96. Thus, the radio tag reading device 1 acquires the tag data containing a merchandise code.

Next, the control unit 82 searches the tag data buffer 114 in Step S97. In Step ST98, the control unit 82 determines whether the tag data buffer 114 stores data that is identical to the tag data acquired from the radio tag 5.

If the tag data buffer 114 has stored data that is identical to the tag data acquired from the radio tag 5 (YES in Step ST98), the control unit 82 discards the identical data from the tag data buffer 114 in Step ST99 (i.e., Second Step).

Thus, of the tag data stored in First Step in the tag data buffer 114, those tag data items read in Second Step are regarded as the data items of the radio tags 5 attached to the items of merchandise 4A, 4B, 4C, 4F, 4G, 4H and 4I held in the selections 3A, 3B, 3C, 3F, 3G, 3H and 3I and are discarded from the tag data buffer 114.

When a tag data item regarded as the data item of a radio tag 5 is thus discarded, the number B of tags from which data has been read, stored in the work area 113 is counted down by "1" in Step ST100. In Step ST101, the control unit 82 compares the number B of tags from which data has been read, thus counted down, with the number A of target tags. In other words, the control unit 82 determines whether the number B is equal to the number A. If the number B is larger than the number A (NO in Step ST101), the control unit 82 will return to Step ST95, in which it waits for the next response signal.

If the tag data buffer 114 does not store data that is identical to the tag data acquired from the radio tag 5, the control unit 82 determines that no data items are identical to one another. If so (NO in Step ST98), the control unit 82 discards the tag data in Step ST102.

Next, the control unit 82 goes to Step ST101 and compares the number B of tags that have been read with the number A of tags from which data should be read, which is stored in the set area 112. If the number B is larger than the number A (NO in Step ST101), the control unit 82 returns to Step ST95 and waits for the next response signal.

Every time the control unit 82 receives a response signal (YES in Step ST95), it performs Steps ST96 to ST100. When the number B becomes equal to the number A (YES in Step ST101), the control unit 82 acquires the tag data stored in the tag data buffer 114 in Step ST103. The tag data thus acquired is output to the POS server via the interface unit 81.

The number B becomes equal to the number A when the data of all radio tags 5 attached to the items of merchandise 4A, 4B, 4C, 4D, 4F, 4G, 4F and 4I held in the sections 3A, 3B, 3C, 3D, 3F, 3G, 3F and 3I are deleted from the tag data buffer 114. At this point, the tag data about the items of merchandise 4E held in the 3E is transmitted to the POS server via the interface unit 81.

When the inventory data is transmitted to the POS server as inventory data, the control unit 82 causes the display unit 87 to display a message, informing that the inventory data has been transmitted to the POS server. Reading this message, the person in charge of inventory can know that an inventory has been completed for the section 3E as desired.

Of the radio tags attached to the items of merchandise 4A, 4B, 4C, 4F, 4I, 4H, 4G and 4D held in the sections 3A, 3B, 3C, 3F, 3I, 3H, 3G and 3D, any radio tag has been read in First Step, but not in Second Step. In this case, the number B of tags already read does not reach the number A of tags from which data should be read. If the display unit 87 does not display the message showing the completion of inventory data, over a given time, the person in charge releases the read button 88 from the pressed state.

While waiting for a response signal coming from any radio tag in Step ST95, the control unit 82 continuously monitors the on-signal coming from the read button 88, in Step ST104. The on-signal ceases when the read button 88 is released from the pressed state. If the on-signal has ceased (YES in Step ST104), the control unit 82 causes the display unit 87 to display an error message.

Thus, the person in charge, who has selected the third operating mode, first holds the radio tag reading device 1 and moves the device 1, positioning the antenna 9 near the section 3E for which an inventory should be made. Data is thereby read from the radio tags 5 attached to the items of merchandise 4E. Then, the person in charge moves the device 1 clockwise or counterclockwise over the sections 3A, 3B, 3C, 3D, 3F, 3G, 3H and 3I that surrounds the section 3E for which an inventory should be made. Data is thereby read from the radio tags 5 attached to the items of merchandise held in the sections 3A, 3B, 3C, 3D, 3F, 3G, 3H and 3I.

Performing these two steps described above, the radio tag reading device 1 can output to the POS server the inventory data, i.e., the data stored in the radio tags 5 attached to all items of merchandise 4E held in the section 3E for which an inventory should be made. Moreover, when the third mode is selected, there is no processing corresponding to the non-target tag buffer 115. Hence, the process efficiency can be further improved, compared to the case where the second mode is selected.

From the inventory data about the section 3E for which an inventory should be made, the POS server finds the number of items of merchandise 4E actually held in the section 3E for which an inventory should be made. Then, the POS server generates inventory data about the items of merchandise 4E from the number of items of merchandise 4E actually held in the section 3E and the logical number of items of merchandise 4E.

Thus, the present embodiment can accurately read data from the radio tags excising in any section for which an inventory should be made, without having additional functions such as a photographing function or an image-processing function. Therefore, the embodiment can increase, at low cost, the accuracy of recognizing the radio tags that exist in any section for which an inventory should be made.

This invention is not limited to the embodiment described above. The components of the embodiment can be modified in various manners in reducing the invention to practice, without departing from the spirit or scope of the invention.

For example, the radio tag reading device 1 may operate in the first operating mode only, though the embodiment described above has the first to third operating modes. If the device 1 has the third operating mode only, the non-target tag buffer 115 can be deleted from the memory 89.

In the embodiment, the output level of the radio signal the antenna 9 transmits is automatically changed. Instead, a switching button may be provided on the main unit 8, and the output level may be manually switched from one to the other.

Further, a step of receiving a section code identifying the section holding for which an inventory should be made may be added, and the section code may be transmitted to the POS server, together with the tag data stored in the tag data buffer 114. Then, the POS server can easily determine that the data received pertains to that section.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio tag reading device having an antenna and designed to perform radio communication with radio tags existing in communication areas where radio signals transmitted from the antenna can travel, thereby to read identification data specific to each radio tag and stored in the tag, the device comprising:
    a target tag storage unit configured to store the tag data items of the radio tags existing in a target section holding the radio tags from which to read data;
    a non-target tag storage unit configured to store at least the identification data specific to any radio tag that exists in non-target sections surrounding the target section holding the radio tags from which to read data;
    a control unit configured to perform a non-target tag process of storing, in the non-target tag storage unit, at least the identification data included in the tag data read from the radio tag via the antenna, and a target tag process of storing, in the target tag storage unit, all tag data read from the radio tags via the antenna, except the tag data stored in the non-target tag storage unit containing the identification data stored in the non-target tag storage unit; and
    an output unit configured to output the tag data stored in the target tag storage unit.

2. The radio tag reading device according to claim 1, further comprising an output switch unit configured to switch the output of the antenna, between at least two values that are a small output and a large output larger than the small output.

3. The radio tag reading device according to claim 2, wherein the control unit first performs the target tag process while the output of the antenna remains small, then performs the non-target tag process while the output of the antenna remains small, and further performs the target tag process while the output of the antenna remains large.

4. The radio tag reading device according to claim 2, wherein the control unit first performs the non-target tag process while the output of the antenna remains small and then performs the target tag process while the output of the antenna remains large.

5. The radio tag reading device according to claim 2, wherein the control unit first performs the target tag process while the output of the antenna remains large and then performs the non-target tag process while the output of the antenna remains small.

6. The radio tag reading device according to claim 5, wherein in the non-target tag process that the control unit performs, the target storage unit is searched for the tag data read from the radio tag via the antenna, and the tag data is deleted, if found, from the target storage unit.

7. The radio tag reading device according to claim 2, wherein the control unit has at least two of first to third operating modes, in the first operating mode, the control unit first performs the target tag process while the output of the antenna remains small, then performs the non-target tag process while the output of the antenna remains small, and further performs the target tag process while the output of the antenna remains large; in the second operating mode, the control unit first performs the non-target tag process while the output of the antenna remains small and then performs the target tag process while the output of the antenna remains large; and in the third operating mode, the control means first performs the target tag process while the output of the antenna remains large and then performs the non-target tag process while the output of the antenna remains small.

8. The radio tag reading device according to claim 1, further comprising a set area for holding the number of tags existing in the target tag section,
wherein the control unit activates the output unit when the number of tag data items stored in the target tag storage unit becomes equal to the number of tags, which is held in the set area.

9. A radio tag reading device having an antenna and designed to perform radio communication with radio tags existing in communication areas where radio signals transmitted from the antenna can travel, thereby to read identification data specific to each radio tag and stored in the tag, the device comprising:
a target tag storage unit configured to store the tag data items of the radio tags existing in a target section holding the radio tags from which to read data;
a control unit configured to perform a target tag process of storing, in the target tag storage unit, tag data read from the radio tags via the antenna, and a non-target tag process of first searching the non-target storage unit for the tag data read from the radio tag via the antenna and deleting the tag data, if found, from the target storage unit; and
an output unit configured to output the tag data stored in the target tag storage unit.

10. The radio tag reading device according to claim 9, further comprising an output switch unit configured to switch the output of the antenna, between at least two values that are a small output and a large output larger than the small output wherein the control unit first performs a target tag process while the output of the antenna remains large and then performs a non-target tag process while the output of the antenna remains small.

11. A radio tag recognition method for use in a radio tag reading device having an antenna and a control unit and designed to perform radio communication with radio tags existing in communication areas where radio signals transmitted from the antenna can travel, thereby to read identification data specific to each radio tag and stored in the tag, the method comprising:
providing a target tag storage unit and a non-target tag storage unit in the radio tag reading device, the target tag storage unit being configured to store the tag data items of the radio tags existing in a target section holding the radio tags from which to read data, and the non-target tag storage unit being configured to store at least the identification data specific to any radio tag that exists in non-target sections surrounding the target section holding the radio tags from which to read data;
causing the control unit to perform a first step of storing the tag data read from a radio tag via the antenna, in the target tag storage unit, a second step of storing at least the identification data included in the tag data read from the radio tag via the antenna, in the non-target tag storage unit, and a third step of storing, in the target tag storage unit, tag data read from the radio tag via the antenna and having identification data not stored in the non-target storage unit; and
recognizing the tag data stored in the target tag storage unit, as the data of the radio tag existing in the target section holding the radio tags from which to read data.

12. The radio tag recognition method according to claim 11, wherein an output switch unit configured to switch the output of the antenna, between at least two values that are a small output and a large output larger than the small output, is provided in the radio tag reading device, the first and second steps are performed while the output of the antenna remains small, and the third step is performed while the output of the antenna remains large.

13. The radio tag recognition method according to claim 11, wherein the step the control unit performs comprises a first step of storing at least identification data read from the radio tag via the antenna, in the non-target tag storage unit, and a second step of storing, in the target tag storage unit, the tag data read from the radio tag via the antenna and not stored yet in the non-target tag storage unit.

14. The radio tag recognition method according to claim 13, wherein an output switch unit configured to switch the output of the antenna, between at least two values that are a small output and a large output larger than the small output, is provided in the radio tag reading device, the first step is performed while the output of the antenna remains small, and the second step is performed while the output of the antenna remains large.

15. The radio tag recognition method according to claim 11, wherein the step the control unit performs comprises a first step of storing the tag data read from the radio tag, in the target tag storage unit, and a second step of searching the target storage unit for the tag data read from the radio tag via the antenna and deleting the tag data, if found, from the target storage unit.

16. The radio tag recognition method according to claim 11, wherein an output switch unit configured to switch the output of the antenna, between at least two values that are a small output and a large output larger than the small output, is provided in the radio tag reading device, the first step is performed while the output of the antenna remains large, and the second step is performed while the output of the antenna remains small.

* * * * *